US005733482A

United States Patent [19]
Hoshiba

[11] Patent Number: 5,733,482
[45] Date of Patent: *Mar. 31, 1998

[54] BAKED COLOR PENCIL LEAD MANUFACTURED BY IMPREGNATION WITH PERHYDROPOLYSILAZANE AND HEAT TREATMENT

[75] Inventor: Masaaki Hoshiba, Fujioka, Japan

[73] Assignee: Mitsubishi Pencil Kabushiki Kaisha, Tokyo, Japan

[*] Notice: The term of this patent shall not extend beyond the expiration date of Pat. No. 5,595,589.

[21] Appl. No.: 504,930

[22] Filed: Jul. 20, 1995

[30] Foreign Application Priority Data

Aug. 5, 1994 [JP] Japan ................................. 6-184611

[51] Int. Cl.$^6$ ........................................ C01B 31/00
[52] U.S. Cl. .................. 264/29.1; 264/29.5; 264/29.6; 264/29.7; 264/41; 264/44; 264/45.9; 264/78; 264/82; 264/83; 264/85; 523/164
[58] Field of Search ..................... 264/29.1, 29.5, 264/29.6, 29.7, 41, 44, 45.9, 60, 62, 65, 78, 82, 83, 85; 523/164

[56] References Cited

U.S. PATENT DOCUMENTS

| | | | |
|---|---|---|---|
| 1,502,763 | 7/1924 | Bugbee | 264/44 |
| 3,446,878 | 5/1969 | Tsukahara | 264/29.7 |
| 3,592,883 | 7/1971 | Kawakubo | 264/29.7 |
| 4,535,007 | 8/1985 | Cannady | 264/29.6 |
| 4,543,344 | 9/1985 | Cannady | 264/65 |
| 4,847,345 | 7/1989 | Takamizawa et al. | 264/29.1 |
| 4,869,854 | 9/1989 | Takeda et al. | 264/29.6 |
| 5,030,702 | 7/1991 | Vaahs et al. | 264/29.1 |
| 5,595,589 | 1/1997 | Hoshiba et al. | 106/19 |

FOREIGN PATENT DOCUMENTS

| | | | |
|---|---|---|---|
| 51-41376 | 11/1976 | Japan . | |
| 55-139472 | 10/1980 | Japan . | |
| 58-45274 | 3/1983 | Japan | 523/164 |
| 58-208360 | 12/1983 | Japan | 523/164 |
| 59-117569 | 7/1984 | Japan . | |
| 59-117570 | 7/1984 | Japan . | |
| 59-204671 | 11/1984 | Japan | 264/29.1 |
| 61-95084 | 5/1986 | Japan | 264/29.1 |
| 61-203184 | 9/1986 | Japan | 523/164 |
| 61-275370 | 12/1986 | Japan . | |
| 64-4555 | 1/1989 | Japan . | |
| 5-302054 | 11/1993 | Japan . | |

OTHER PUBLICATIONS

Database WPI, Week 8939, Derwent Publications Ltd., London, GB; AN 89-280942 & JP-A-01 203 476 (Toa Nenryo Kogyo KK), 16 Aug. 1989 (Abstract only).

Primary Examiner—Donald E. Czaja
Assistant Examiner—Michael P. Colaianni
Attorney, Agent, or Firm—Darby & Darby

[57] ABSTRACT

By kneading a composition containing a filler and an organic forming binder, extruding the composition, baking the composition in a non-oxidizing atmosphere, there is obtained a first baked lead containing, as a binder, a carbon obtained by the carbonization of the organic forming binder. Then, by heating the first baked lead in an oxidizing atmosphere to remove the binder carbon, there is formed a second baked lead composed of at least the filler. The pores of the second baked lead are impregnated with a solution containing perhydropolysilazane, subjecting the lead to a heat treatment in an inert atmosphere or an ammonia gas atmosphere to form a third baked lead containing the resultant silicon nitride. Finally, ink is filled into the pores of the third baked lead to provide a baked color pencil lead.

17 Claims, No Drawings

BAKED COLOR PENCIL LEAD MANUFACTURED BY IMPREGNATION WITH PERHYDROPOLYSILAZANE AND HEAT TREATMENT

BACKGROUND OF THE INVENTION

(1) Field of the Invention

The present invention relates to a baked color pencil lead, in which a baked lead is impregnated with an ink, which has sufficient coloring properties and a high drawing line density and which are excellent in mechanical strength, i.e., bending strength, tensile strength, impact strength and the like. The present invention also relates to a method for manufacturing the baked color pencil lead.

(2) Description of the Prior Art

Conventional baked color pencil leads have been manufactured by adding a filler such as boron nitride and if necessary, a heat-resistant pigment and a reaction accelerator to one or more kinds of clays and the like as binders to obtain a blend composition, kneading the blend composition, extruding the kneaded composition, thermally treating it to obtain porous baked leads, and then filling an ink comprising a dye and a pigment into the pores of these leads. In this case, as important characteristics of the color pencil leads, there have been required high mechanical strength, good coloring properties and a high drawing line density.

However, in the conventional baked color pencil leads, the mechanical strength is poor, and the density and the coloring properties are not satisfactory as well. In order to meet the above-mentioned requirements, it is necessary that the amount of the ink to be filled into the leads is increased by raising the porosity of the leads, while the sufficient mechanical strength is maintained.

As techniques for raising the porosity of the baked color pencil leads, there have been suggested, for example, a method which comprises adding a pore forming agent, i.e., a resin to a filler and a binder, and then sublimating the resin or burning the same in an oxidizing atmosphere during a backing step (Japanese Patent Publication Nos. Sho 64-4555 (1989) and Sho 51-41376(1976)); a method which comprises burning a granulated carbon material as a pore forming agent in an oxidizing atmosphere to form many pores (Japanese Patent Application Laid-open No. Sho 61-275370 (1986)); and a method which comprises burning a fibrous material as the pore forming agent in an oxidizing atmosphere, or sublimating or melting it by heating to form many pores (Japanese Patent Application Laid-open No. Hei 5-302054(1993)).

However, in the conventional baked leads comprising the clay and the like as the binder, bonding force between a filler such as boron nitride and a binder such as the clay is weak, and in addition, the strength of the clay itself is also low. In consequence, the strength of the obtained baked color pencil leads is presently so low as to be impractical. Furthermore, since the clay contains impurities, the baked leads are usually colored, which inconveniently has a bad influence on the coloring properties of drawn lines, and in particular, such impurities cause the drawn lines having a light color to darken.

Hence, in order to obtain white porous leads having the high strength, there have been suggested a method using a nitride of aluminum as a binder in place of the clay and the like (Japanese Patent Application Laid-open No. Sho 59-117570(1984)), and another method using a nitride of silicon (Japanese Patent Application Laid-open No. Sho 59-117569(1984)).

However, in the former method using aluminum or an aluminum compound, it is difficult to obtain fine powder having a particle diameter of 2 µm or less suitable for the binder, and if the powder is coarse, a writing performance inconveniently deteriorates.

In the latter method, silicon nitride has the high strength, and so it is very useful as the binder. As methods for manufacturing the porous leads containing this silicon nitride as the binder, there are known, for example, (1) a method which comprises kneading the silicon nitride powder with the filler and the like, molding the mixture, and then baking it under pressure in a nitrogen atmosphere, and (2) a method which comprises kneading the silicon powder with the filler and the like, molding the mixture, and then baking it in a nitrogen atmosphere or an ammonia gas atmosphere to cause nitriding.

In the above-mentioned method (1), however, the baking of silicon nitride is difficult, so that even if the pressure is applied, it is inconveniently hard to obtain the color pencil leads having the high strength.

In addition, in the above-mentioned method (2), the silicon powder having a particle diameter of 1 µm or less suitable for the binder is liable to spontaneously oxidize, whereby it becomes the oxidized silicon powder. For the prevention of such oxidation, much attention is required to be paid. The reason why the oxidized silicon powder is not desirable is that if the oxidized silicon is baked in the presence of carbon at a temperature of 1200° to 1300° C. in a nitrogen atmosphere, the oxidized silicon is nitrided, so that vapor phase growth occurs, leading to a silicon nitride whisker and the like. Moreover, if the silicon powder is coarse, the writing performance inconveniently deteriorates.

SUMMARY OF THE INVENTION

The present invention has been accomplished with the intention of solving some problems of conventional techniques, particularly problems in the case that a nitride of silicon is used as a material of conventional porous leads, and an object of the present invention is to provide a baked color pencil lead having remarkably excellent mechanical strength, excellent coloring properties and a smooth writing performance, and a method for manufacturing the lead.

According to an aspect of the present invention, there is provided a baked color pencil lead manufactured by a method which comprises the steps of kneading a composition comprising a filler and an organic forming binder, extruding the composition, baking the molded composition in a non-oxidizing atmosphere to prepare a first baked lead having pores formed thereby and containing, as a binder, a carbon obtained by the carbonization of the organic forming binder, heating the first baked lead in an oxidizing atmosphere to prepare a second baked lead comprising the filler and having pores which are formed by removing the binder carbon, impregnating the pores of the second baked lead with a solution containing perhydropolysilazane, subjecting the second baked lead to a heat treatment in an inert atmosphere or an ammonia gas atmosphere to prepare a third baked lead comprising the resultant silicon nitride and the filler, and then filling an ink into the pores of the third baked lead.

According to another aspect of the present invention, there is provided a method for manufacturing a baked color pencil lead which comprises the steps of kneading a composition comprising a filler and an organic forming binder, extruding the composition, baking the molded composition in a non-oxidizing atmosphere to prepare a first baked lead having pores formed thereby and containing, as a binder, a carbon obtained by the carbonization of the organic forming binder, heating the first baked lead in an oxidizing atmosphere to prepare a second baked lead comprising the filler and having pores which are formed by removing the binder carbon, impregnating the pores of the second baked lead with a solution containing perhydropolysilazane, subjecting the second baked lead to a heat treatment in an inert atmosphere or an ammonia gas atmosphere to prepare a third baked lead comprising the resultant silicon nitride and the filler, and then filling an ink into the pores of the third baked lead.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

The present inventor has intensively researched to solve the above-mentioned problems, and as a result, it has been found that when the pores of a specific baked porous lead comprising a filler are impregnated with a solution containing perhydropolysilazane and the resultant baked porous lead is subjected to a heat treatment in an inert atmosphere or an ammonia gas atmosphere, silicon nitride can be produced as a binder, whereby the conventional problems can be solved. In consequence, the present invention has now been completed.

That is to say, a baked color pencil lead of the present invention can be manufactured by a method which comprises the steps of kneading a composition comprising a filler and an organic forming binder, extruding the composition, baking the molded composition in a non-oxidizing atmosphere to prepare a first baked lead having pores formed thereby and containing, as a binder, a carbon obtained by the carbonization of the organic forming binder, heating the first baked lead in an oxidizing atmosphere to prepare a second baked lead comprising the filler and having pores which are formed by removing the binder carbon, impregnating the pores of the second baked lead with a solution containing perhydropolysilazane, subjecting the second baked lead to a heat treatment in an inert atmosphere or an ammonia gas atmosphere to prepare a third baked lead comprising the resultant silicon nitride and the filler, and then filling an ink into the pores of the third baked lead.

In addition, a method for manufacturing a baked color pencil lead of the present invention comprises the steps of kneading a composition comprising a filler and an organic forming binder, extruding the composition, baking the molded composition in a non-oxidizing atmosphere to prepare a first baked lead having pores formed thereby and containing, as a binder, a carbon obtained by the carbonization of the organic forming binder, heating the first baked lead in an oxidizing atmosphere to prepare a second baked lead comprising the filler and having pores which are formed by removing the binder carbon, impregnating the pores of the second baked lead with a solution containing perhydropolysilazane, subjecting the second baked lead to a heat treatment in an inert atmosphere or an ammonia gas atmosphere to prepare a third baked lead comprising the resultant silicon nitride and the filler, and then filling an ink into the pores of the third baked lead.

"The inert atmosphere" referred to in the present invention means an inert atmosphere such as a nitrogen gas atmosphere or an argon gas atmosphere.

In the present invention, a raw material of the first baked leads is a blend composition containing at least a filler and an organic forming binder.

No particular restriction is put on the filler, and any filler can be used, so far as it has been used in conventional baked color pencil leads. Examples of the filler include white fillers such as titanium oxide, mica, talc, boron nitride, silica, alumina and calcium carbonate, colored fillers such as molybdenum disulfide and tungsten disulfide which should be selected in consideration of the desired color of the leads, and mixtures of two or more kinds thereof. If necessary, a heat-resistant pigment may be further blended.

Furthermore, examples of the organic forming binder include thermoplastic resins such as a vinyl chloride resin, a chlorinated vinyl chloride resin and a polyvinyl alcohol, thermosetting resins such as a furan resin, a phenolic resin and an epoxy resin, natural polymers such as lignins, celluloses and tragacanth gums, pitches such as petroleum asphalt, coal tar pitch, naphtha cracking pitch and dry distillation pitch of a synthetic resin or the like, and mixtures of two or more thereof.

For the purposes of improving the characteristics of the composition at its kneading which is carried out by adding high shear strength and improving the extrusion characteristics of the composition, there may be blended to the composition, if necessary, one or more of plasticizers or solvents for the organic forming binder such as water, dioctyl phthalate (DOP), dibutyl phthalate (DBP), tricresyl phosphate (TCP), dioctyl adipate (DOA), propylene carbonate, alcohols, ketones and esters.

The blend composition is sufficiently mixed by Henschel mixer and kneaded by a pressure kneader, a twin roll or the like, and then extruded in the form of a thin line or the like by an extruder. Next, the extruded composition is baked in a non-oxidizing atmosphere such as a nitrogen atmosphere or an atmosphere of an inert gas such as an argon gas to obtain a first baked lead in which a carbon produced by the carbonization of the organic forming binder is contained as the binder.

In the thus obtained first baked lead, pores and the binder carbon formed by the baking are sufficiently present and uniformly dispersed in a fine state, and the filler is highly oriented.

In order to enhance the strength of the second baked lead and to improve the handling properties thereof, a clay, for example, an inorganic binder such as bentonite and kaolinite may be blended with the blend composition from which the first baked lead can be obtained, if necessary. If the amount of the inorganic binder to be blended is less than 25% by weight, then the results are particularly advantageous because the strength by virtue of silicon nitride which will be described hereinafter is likely to appear.

Furthermore, if necessary, the first baked lead which has been obtained in the above steps may be impregnated with a solution containing perhydropolysilazane, and then subjected to a heat treatment in an inert atmosphere such as a nitrogen atmosphere or an ammonia gas atmosphere to produce silicon nitride.

The first baked lead which has been obtained in the above steps is heated in an oxidizing atmosphere to prepare the second baked porous lead having many pores which are formed by removing the binder carbon.

Here, the pores of the second baked lead are composed of both pores obtained by baking the kneaded composition containing the filler and the organic forming binder in the non-oxidizing atmosphere and pores obtained by removing the binder carbon. The porosity of the second baked lead can be adjusted mainly by regulating a blend ratio of the organic forming binder, but another pore forming material such as carbon particles may be suitably added to control the porosity. The ratio of the pores formed by the removal of the binder carbon to the total pores is utterly optional.

The obtained second baked lead is a porous lead having many pores as described above, and the fine pores are uniformly dispersed in a sufficient amount and the filler is highly oriented. The second baked lead obtained from the first baked lead is useful to obtain the desired baked color pencil lead having the high strength.

In the present invention, the third baked lead can be obtained by immersing the second baked porous lead obtained in the above steps in a solution containing perhydropolysilazane, and then subjecting the resultant second baked lead to the heat treatment at a temperature of 400° to 1100° C., preferably 600° to 1000° C. in an inert atmosphere such as a nitrogen atmosphere or an ammonia gas atmosphere to produce silicon nitride as a binder in the second baked lead. If the temperature in the heat treatment is 1300° C. or more, silicon nitride crystallizes, so that the bending strength of the lead deteriorates inversely.

When a large amount of the perhydropolysilazane-containing solution is filled into the second baked lead, i.e., when the porosity of the second baked lead is high, a large amount of silicon nitride is produced as the binder, so that the mechanical strength of the resultant third baked lead become high.

However, if the porosity of the second baked lead is in excess of 80%, the shape of the lead can scarcely be maintained, so that it is difficult to successfully carry out the immersion step of the perhydropolysilazane-containing solution. Moreover, if the porosity is less than 30%, the perhydropolysilazane-containing solution is not sufficiently filled into the second baked lead, so that the remarkable improvement of the mechanical strength cannot be expected. In addition, if it is less than 30%, the sufficient amount of an ink cannot be filled into the obtained third baked leads, so that a practical color and density cannot be obtained.

Therefore, the porosity of the second baked lead is in the range of 30 to 80%, and for the improvement of the quality of the obtained third baked lead, it is preferably in the range of 35 to 75%.

In the present invention, the perhydropolysilazane which is used to obtain the third baked lead is a ceramic precursor polymer in which a main chain has a [—Si—N—] structure and side chains have hydrogen atoms alone, and it can be represented by the general formula $[SiH_aN_b]_n$ wherein a is from 1 to 3 and b is 0 or 1. The polymer mainly has a skeleton structure of $[-SiH_2NH-]_n$. Furthermore, by the thermal decomposition in the inert atmosphere such as the nitrogen atmosphere or the ammonia gas atmosphere, the hydrogen atoms alone are eliminated, and in consequence, silicon nitride can be obtained as the binder in a very high yield.

Most of the produced silicon nitride is amorphous trisilicon tetranitride ($Si_3N_4$) at a temperature of 400° to 1100° C., but a small amount of the silicon nitride is present in the state of another structure ($Si_xN_y$), depending upon raw materials to be used, conditions of the thermal treatment and the like.

Furthermore, the silicon nitride does not contain an organic component such as a methyl group, so that the colorless, transparent, high-purity and carbon-free silicon nitride can be obtained. In addition, the present invention is characterized in that the silicon nitride can be obtained at a lower temperature compared with other baking methods, i.e., in the inert atmosphere such as the nitrogen atmosphere or the ammonia gas atmosphere at a low temperature of about 600° C., while a heat treatment is carried out at a temperature of 1200° to 1400° C. in the other baking methods that silicon nitride is produced from silicon powder.

The solution containing perhydropolysilazane which is used in the present invention can be prepared by dissolving the perhydropolysilazane in an organic solvent. No particular restriction is put on the kind of the organic solvent, and any organic solvent can be used, so far as the second baked lead can be impregnated with the solution containing perhydropolysilazane. Examples of the usable organic solvent include benzene, toluene, xylene, tetrahydrofuran (THF), methylene chloride, carbon tetrachloride and aromatic hydrocarbons.

The impregnation of the second baked lead with the perhydropolysilazane-containing solution can be carried out by immersing the second baked lead in the solution containing perhydropolysilazane, if necessary, under conditions of heating, pressure reduction, pressure application or the like.

In consequence, the solution containing perhydropolysilazane is finely and uniformly dispersed in the second baked lead to complete the impregnation. That is to say, since the second baked lead has the sufficient amount of the fine pores, and the pores are uniformly dispersed in the lead, and the filler is highly oriented in the lead, which is useful to obtain the desired baked color pencil lead having the high strength as described above, the perhydropolysilazane-containing solution becomes finely and uniformly dispersed in the second baked lead.

In order to obtain the third baked lead having the high strength, the impregnation with the perhydropolysilazane-containing solution and the baking step may be repeatedly carried out, if necessary.

According to the obtained third baked lead, the resultant silicon nitride as the binder is finely and uniformly dispersed in the lead, and the filler is highly oriented therein. Therefore, the strength of the lead increases due to a small amount of the produced silicon nitride, and the abrasion of the lead at the time of writing can also be uniformly accomplished.

In the present invention, the baked color pencil lead can be obtained by filling an ink into the pores of the third baked lead obtained in the above-mentioned step.

As the ink which can be filled into the pores of the third baked lead, any conventional known ink can be used, so far as it is suitable for color pencil leads. For example, a printing ink, a stamp ink, a ballpoint pen ink, an aqueous writing ink and the like which have usually been used can be employed in the present invention. In this connection, this kind of the inks can generally be prepared by dissolving and dispersing a colorant such as a dye and a pigment in an animal or vegetable oil, a synthetic oil, an alcohol, a hydrocarbon oil, water or the like, and if necessary, further adding a resin, a surface active agent and the like.

The filling of the ink into the third baked lead can be accomplished by immersing the third baked lead in the ink under conditions of heating, pressure reduction, pressure application or the like to fill the ink into the pores of the lead. If necessary, the filling step may be repeatedly carried out.

The baked color pencil lead and the manufacturing method of the same according to the present invention have the following functional effects of (1) to (4).

(1) The second baked lead, which are formed by heating the first baked lead in the oxidizing atmosphere to remove the binder carbon, becomes a porous lead having many pores, and by impregnating the second baked lead with the perhydropolysilazane-containing solution, and then subjecting the lead to the heat treatment in an inert atmosphere such as a nitrogen atmosphere or an ammonia gas atmosphere, silicon nitride can be produced as a binder in the second baked lead. Therefore, the mechanical strength of the baked lead improves.

(2) In the second baked lead formed by heating the first baked lead in the oxidizing atmosphere to remove the binder carbon, the sufficient amount of the fine pores are uniformly dispersed, and the filler is highly oriented. Accordingly, by producing a small amount of the silicon nitride having the high strength in the second baked lead, the strength of the third baked lead can be enhanced, while the pores into which the ink necessary to obtain a high drawing line density is filled are maintained.

(3) Since the colorless and transparent silicon nitride can be obtained by the use of the solution containing perhydropolysilazane, the third baked lead becomes white if the white filler is selected. In consequence, the color of lines drawn by the baked color pencil lead is not adversely affected thereby.

(4) The silicon nitride is finely and uniformly dispersed as the binder in the third baked lead, and therefore the highly oriented filler can be uniformly abraded at the time of writing, so that a writing performance is equal to or better than that of conventional baked color pencil leads using a clay or the like as the binder.

EXAMPLES

Next, the present invention will be described in more detail with reference to examples, but the scope of the present invention should not be limited to these examples.

Example 1

| Boron nitride | 50 parts by weight |
| Vinyl chloride resin | 50 parts by weight |
| Dioctyl phthalate (DOP) | 20 parts by weight |
| Zinc stearate | 1 part by weight |

These materials were mixed by a Henschel mixer, kneaded by a pressure kneader and a twin roll, extruded into thin lines, thermally treated at 180° C. for 10 hours in air to remove the remaining plasticizer therefrom, heated up to 300° C. at 10° C./hr and from 300° C. to 1000° C. at 30° C./hr in a nitrogen atmosphere, and then baked at 1000° C. for 1 hour to obtain the first baked leads.

These first baked leads were baked at about 700° C. in an oxidizing atmosphere to remove the remaining carbonized resin content, thereby obtaining the white second baked leads (porosity=47.8%).

The second baked leads were impregnated with a solution containing perhydropolysilazane (a 20% xylene solution) at room temperature for 1 day, heated up to 600° C. at 60° C./hr in a nitrogen atmosphere, and then baked at 600° C. for 1 hour to obtain baked leads. Furthermore, these baked leads were impregnated with a solution containing perhydropolysilazane, and the above baking step was further repeated once more to obtain the white third baked leads having a diameter of 0.57 mm.

Next, the third baked leads were immersed in a red ink, and then allowed to stand at 70° C. for 24 hours. The surfaces of the third baked leads into which the dye had been filled were washed with an alcohol, thereby preparing red baked color pencil leads having a diameter of 0.57 mm.

Example 2

| Boron nitride | 50 parts by weight |
| Bentonite | 5 parts by weight |
| Polyvinyl alcohol | 45 parts by weight |
| Water | 100 parts by weight |

These materials were mixed by a Henschel mixer, kneaded by a twin-roll mill to adjust a moisture content, extruded into thin lines, dried at 105° C. for 15 hours or more, heated up to 1100° C. in an argon gas, and then baked for 1 hour to obtain the first baked leads.

Next, these first baked leads were heated up to about 600° C. in an oxidizing atmosphere, and then baked at 600° C. for 5 hours, thereby obtaining the second baked leads (porosity=40.3%).

The second baked leads were impregnated with a solution containing perhydropolysilazane at room temperature for 1 day, heated up to 600° C. at 60° C./hr in a nitrogen atmosphere, and then baked at 600° C. for 1 hour to obtain the white third baked leads having a diameter of 0.57 mm.

Next, the third baked leads were immersed in a red ink, and then allowed to stand at 70° C. for 24 hours. The surfaces of the baked leads into which the dye had been filled were washed with an alcohol, thereby preparing red baked color pencil leads having a diameter of 0.57 mm.

Comparative Example 1

| Fine silicon powder | 10 parts by weight |
| Boron nitride | 50 parts by weight |
| Polystyrene | 20 parts by weight |
| Dioctyl phthalate (DOP) | 20 parts by weight |
| Methyl ethyl ketone | 100 parts by weight |

These materials were mixed by a Henschel mixer, kneaded by a three-roll mill, extruded, sufficiently dried at 180° C. for 10 hours in air to remove the remaining solvent and plasticizer therefrom, heated up to 1250° C. over 24 hours in a nitrogen atmosphere, maintained at 1250° C. for 24 hours, further heated up to 1450° C. over 4 hours, and then baked at 1450° C. for 10 hours to obtain white baked leads having a diameter of 0.57 mm. Next, the baked leads were immersed in a red ink, and then allowed to stand at 70° C. for 24 hours. The surfaces of the baked leads into which the dye had been filled were washed with an alcohol, thereby preparing red baked color pencil leads having a diameter of 0.57 mm.

Comparative Example 2

| Boron nitride | 60 parts by weight |
| Bentonite | 30 parts by weight |
| Polyvinyl alcohol | 10 parts by weight |
| Water | 100 parts by weight |

These materials were mixed by a Henschel mixer, kneaded by a twin-roll mill to adjust a moisture content, extruded into thin lines, dried at 105° C. for 15 hours or more, heated up to 1100° C. in an argon gas, and then baked for 1 hour to obtain the first baked leads.

Next, these first baked leads were heated up to 600° C. in an oxidizing atmosphere, and then baked at 600° C. for 5 hours to obtain the second baked leads (porosity=24.7%).

The second baked leads were impregnated with a solution containing perhydropolysilazane at room temperature for 1 day, heated up to 600° C. at 60° C./hr in a nitrogen atmosphere, and then baked at 600° C. for 1 hour to obtain the white third baked leads having a diameter of 0.57 mm.

Next, the third baked leads were immersed in a red ink, and then allowed to stand at 70° C. for 24 hours. The surfaces of the baked leads into which the dye had been filled were washed with an alcohol, thereby preparing red color pencil leads having a diameter of 0.57 mm.

For the red color pencil leads prepared in Examples 1 and 2 as well as Comparative Examples 1 and 2, bending strength (MPa) was measured in accordance with JIS-S-6005-1989, and a writing performance and the coloring properties of drawn lines were evaluated as well. The results of these tests are shown in Table 1.

The evaluation of the writing performance and the coloring properties of drawn lines were made in accordance with physical tests by experts. The measurement of the porosity was carried out by means of a mercury porosimeter.

TABLE 1

| | Example 1 | Example 2 | Comp. Example 1 | Comp. Example 2 |
|---|---|---|---|---|
| Bending Strength (MPa) Evaluation | 270.0 | 230.7 | 180.3 | 86.5 |
| Writing Performance | Good | Good | Good | Good |
| Coloring Properties of Drawn Lines | Sharp color | Sharp color | Faint color | Dark color |

According to total judgment on the basis of the results shown in Table 1, the baked color pencil leads of Examples 1 and 2 regarding the present invention are more excellent in bending strength as compared with the baked color pencil leads of Comparative Examples 1 and 2 regarding conventional examples, and they show a writing performance equal to or better than that of the conventional examples. Additionally, it is also apparent that in the baked color pencil leads regarding the present invention, the color of drawn lines is sharp.

According to individual judgment, the baked color pencil leads of Examples 1 and 2 have large porosities but are remarkably excellent in mechanical strength, so that they are practically less breakable. In addition, it is also apparent that a large amount of an ink can be filled into the leads, whereby remarkably excellent coloring properties and the good writing performance can be obtained from the baked color pencil leads of the present invention.

On the contrary, Comparative Example 1 is connected to baked color pencil leads prepared by a baking method wherein silicon nitride is produced from fine silicon powder. In this case, the fine silicon powder which is liable to oxidize is used, and therefore its handling is troublesome during a manufacturing process and a baking temperature is also as high as 1200° C. or more. In addition, the color of the drawn lines is not sharp.

In Comparative Example 2, the silicon nitride is produced as a binder by the use of a perhydropolysilazane-containing solution, as in Examples 1 and 2, but since polyvinyl alcohol as a forming binder is used in a small amount, there is provided a small amount of pores formed in the baked leads, so that the amount of the produced silicon nitride is also insufficiently limited, with the result that bending strength is low. In addition, the leads of Comparative Example 2 contain a clay as much as 30%, and for this reason, the color of the drawn lines is dark.

According to the present invention, there can be provided baked color pencil leads which have a large porosity but which are remarkably excellent in mechanical strength and hence practically less breakable. In addition, a large amount of an ink can be filled into the baked color pencil leads, so that the baked color pencil leads have remarkably excellent coloring properties, a high drawing line density, and a good writing performance.

Furthermore, according to the present invention, there can be provided a method for preparing novel baked color pencil leads having the sufficient coloring properties, the high drawing line density and the excellent mechanical strength. In the method of the present invention, the perhydropolysilazane-containing solution is used, whereby the high-purity silicon nitride can be produced as the binder for the second baked leads comprising porous leads in a very high yield and at a lower temperature than in conventional baking methods.

What is claimed is:

1. A baked color pencil lead manufactured by a method, comprising the steps of:

kneading a composition comprising a filler and an organic forming binder;

extruding the composition, thereby forming a molded composition;

baking the molded composition in a non-oxidizing atmosphere to prepare a first baked lead having pores formed thereby and containing, as a binder, a carbon obtained by the carbonization of the organic forming binder;

heating the first baked lead in an oxidizing atmosphere to prepare a second baked lead comprising the filler and having pores which are formed by removing the binder carbon;

impregnating the pores of the second baked lead with a solution containing perhydropolysilazane;

subjecting the second baked lead to a heat treatment at 400° to 1100° C. in an inert atmosphere or an ammonia gas atmosphere to prepare a third baked lead comprising the resultant, amorphous silicon nitride and the filler; and filling ink into the pores of the third baked lead.

2. The baked color pencil lead according to claim 1, wherein the filler is selected from the group consisting of a white filler, a colored filler and mixtures thereof.

3. The baked color pencil lead according to claim 2, wherein the white filler is selected from the group consisting of titanium oxide, mica, talc, boron nitride, silica, alumina, calcium carbonate and mixtures thereof.

4. The baked color pencil lead according to claim 2, wherein the colored filler is selected from the group consisting of molybdenum disulfide, tungsten disulfide and mixtures thereof.

5. The baked color pencil lead according to claim 1, wherein the forming binder is selected from the group consisting of thermoplastic resins, thermosetting resins, natural polymers, pitches and mixtures thereof.

6. The baked color pencil lead according to claim 5, wherein the thermoplastic resin is selected from the group consisting of a vinyl chloride resin, a chlorinated vinyl chloride resin, a polyvinyl alcohol and mixtures thereof.

7. The baked color pencil lead according to claim 5, wherein the thermosetting resin is selected from the group consisting of a furan resin, a phenolic resin, an epoxy resin and mixtures thereof.

8. The baked color pencil lead according to claim 5, wherein the natural polymer is selected from the group consisting of lignin, a cellulose, tragacanth gum and mixtures thereof.

9. The baked color pencil lead according to claim 5, wherein the pitch is selected from the group consisting of a petroleum asphalt, a coal tar pitch, a naphtha cracking pitch, a dry distillation pitch and mixtures thereof.

10. The baked color pencil lead according to claim 1, wherein the porosity of the second baked lead which is impregnated with the solution containing perhydropolysilazane is in the range of 30 to 80%.

11. The baked color pencil lead according to claim 1, wherein the composition to be kneaded contains a plasticizer or a solvent selected from the group consisting of water, dioctyl phthalate, dibutyl phthalate, tricresyl phosphate, dioctyl adipate, propylene carbonate, alcohols, ketones, esters and mixtures thereof.

12. A method for manufacturing a baked color pencil lead, comprising the steps of:

kneading a composition comprising a filler and an organic forming binder;

extruding the composition, thereby forming a molded composition;

baking the molded composition in a non-oxidizing atmosphere to prepare a first baked lead having pores formed thereby and containing, as a binder, a carbon obtained by the carbonization of the organic forming binder;

heating the first baked lead in an oxidizing atmosphere to prepare a second baked lead comprising the filler having pores which are formed by removing the binder carbon;

impregnating the pores of the second baked lead with a solution containing perhydropolysilazane;

subjecting the second baked lead to a heat treatment in an inert atmosphere or an ammonia gas atmosphere to prepare a third baked lead comprising the resultant silicon nitride and the filler; and filling ink into the pores of the third baked lead.

13. The method for manufacturing a baked color pencil lead according to claim 12, wherein the filler is selected from the group consisting of a white filler, a colored filler and mixtures thereof.

14. The method for manufacturing a baked color pencil lead according to claim 12, wherein the forming binder is selected from the group consisting of thermoplastic resins, thermosetting resins, natural polymers, pitches and mixtures thereof.

15. The method for manufacturing a baked color pencil lead according to claim 12, wherein the heat treatment after the impregnation of the second baked lead with the solution containing perhydropolysilazane is carried out at a temperature of 400° to 1100° C.

16. The method for manufacturing a baked color pencil lead according to claim 12, wherein the porosity of the second baked lead which is impregnated with the solution containing perhydropolysilazane is in the range of 30 to 80%.

17. The method for manufacturing a baked color pencil lead according to claim 12, wherein the composition to be kneaded contains a plasticizer or a solvent selected from the group consisting of water, dioctyl phthalate, dibutyl phthalate, tricresyl phosphate, dioctyl adipate, propylene carbonate, alcohols, ketones, esters and mixtures thereof.

* * * * *